United States Patent [19]

Myers et al.

[11] Patent Number: 4,957,670
[45] Date of Patent: Sep. 18, 1990

[54] METHOD AND APPARATUS FOR PLASTIC INJECTION MOLDING/ENCAPSULATION

[75] Inventors: Christopher S. Myers, Carlsbad, Calif.; Thomas H. Wozniak, Yardley, Pa.

[73] Assignees: General Motors Corporation, Detroit, Mich.; Hughes Aircraft Company, Los Angeles, Calif.

[21] Appl. No.: 472,491

[22] Filed: Jan. 30, 1990

[51] Int. Cl.⁵ .................. B29C 45/14; B29C 45/76
[52] U.S. Cl. ........................... 264/40.1; 425/116; 425/129.1; 425/136
[58] Field of Search .................. 264/40.1, 40.2; 425/116, 129.1, 136, 137, 169

[56] References Cited

U.S. PATENT DOCUMENTS 2,317,839  4/1943  Westin ........................... 425/137

FOREIGN PATENT DOCUMENTS 0191642   8/1986  European Pat. Off. ........... 425/137
45-34714  6/1970  Japan ............................. 425/137
62-18231  1/1987  Japan ............................. 425/169
1316841   6/1987  U.S.S.R. ......................... 425/169

Primary Examiner—Jan H. Silbaugh
Assistant Examiner—Brian C. Jones
Attorney, Agent, or Firm—Randy W. Tung

[57] ABSTRACT

A plastic injection molding/encapsulation apparatus for the peripheral encapsulation of a glass workpiece which is equipped with an optical sensing device including a light source, a light detector, and a light reflector to detect possible glass breakage of the workpiece and thus automatically shutting down the plastic injection process to avoid damage to the mold.

2 Claims, 2 Drawing Sheets

METHOD AND APPARATUS FOR PLASTIC INJECTION MOLDING/ENCAPSULATION

This invention generally relates to a plastic injection molding/encapsulation apparatus for the encapsulation of a glass workpiece and, more particularly, relates to a plastic injection molding/encapsulation apparatus for the encapsulation of a glass workpiece which is equipped with an optical sensing device to detect possible glass breakage of the workpiece and thus automatically shutting down the plastic injection process to avoid damage to the mold.

BACKGROUND OF THE INVENTION

Glass windows are broadly used in automobiles. Some of the glass windowpanes, specifically those mounted stationarily, are equipped with plastic gaskets around their periphery to provide environmental seal. A convenient method of installing these plastic gaskets on the glass windowpanes is to mold in place the plastic gaskets around the periphery of the glass windowpanes by a plastic injection molding/encapsulation process.

In a typical plastic injection molding/encapsulation process, a set of matched metal molds is used. The molds are designed such that a glass workpiece can be held securely in the middle of the molds while the periphery of the glass workpiece is exposed to the mold cavity. The mold cavity is provided such that it is in fluid communication with an injection gating device located on the side of the mold adjacent to the parting line of the two molds. When molten plastic material is injected into the mold cavity, it rapidly flows around the periphery of the glass workpiece filling the mold cavity and thus providing a plastic gasket around the perimeter of the glass workpiece.

The glass windowpanes used in automobiles are normally made from tempered glass. Frequently, when a glass workpiece is loaded into the mold apparatus and clamped between the upper and the lower mold halves, the clamping pressure placed on the glass workpiece would break and shatter the workpiece. We have observed a unique property of tempered glass is that it always breaks in a consistent and uniform manner. This is caused by the tremendous amount of tension and compression in the glass in its normal unstressed state. During breakage of a piece of tempered glass, the cracks produced in the glass always run perpendicular to the glass surface evenly along the entire surface area of the glass.

If the glass workpiece breaks after the mold is closed and clamped together and such breakage is not detected, the subsequent injection of the molten plastic material into the mold would cause severe damage to the mold cavity. Since the surface area of the mold cavity is normally highly polished in order to produce a high gloss finish on the plastic gasket, any scratch of such highly polished surface would require significant amount of time and labor to remove the mold from the injection molding machine and to repair the mold. This type of repair causes a significant amount of downtime in the production of plastic encapsulated glass workpieces.

It is, therefore, an object of the present invention to provide a mold apparatus for the plastic injection molding/encapsulation of plastic materials around a glass workpiece equipped with an optical sensing device for glass breakage such that the subsequent plastic injection process can be stopped to avoid damages to the mold apparatus.

It is another object of the present invention to provide a mold apparatus for the plastic injection molding/encapsulation of plastic materials around a glass workpiece equipped with an optical sensing device for glass breakage such that any cracks in the glass workpiece may be detected and an automatic shutoff device may be triggered to stop the plastic injection process to avoid any damages to the surface of the mold cavity.

It is a further object of the present invention to provide a mold apparatus for the plastic injection molding/encapsulation of plastic materials around a glass workpiece equipped with an optical sensing device for glass breakage that is sensitive to detect cracks in tinted glass and glass workpieces contaminated with fingerprints and dirt such that an automatic shutoff device may be triggered to stop the plastic injection process to avoid damages to the mold cavity.

SUMMARY OF THE INVENTION

In accordance with a preferred practice of my invention, a mold apparatus for the plastic injection molding/encapsulation of plastic materials on a glass workpiece equipped with an optical sensing device for glass breakage may be constructed as follows.

The mold apparatus is constructed of two matched mold halves. In one of the mold halves, for instance, the upper mold half, recessed areas are built into the mold surface facing the lower mold half when the two mold halves are clamped in a closed position. In the recessed areas, a light source and a detector are separately mounted to deliver a light beam and to receive the reflected light beam. In the other mold half, for instance, the lower mold half, a mirror-type light reflector is mounted on the mold surface facing the upper mold when the two mold halves are clamped together. The light reflector is preferably mounted in a recessed area of the lower mold surface such that it is in a spaced relationship to the glass workpiece during a molding/encapsulation operation.

In operation, light originates from the light source and travels through the glass workpiece is reflected by the mirror-like light reflector and travels once again through the glass workpiece and into a light sensitive detector. Normally, this light path is not obstructed, but when a glass breakage occurs, the light intensity reaching the detector is greatly reduced due to the obstructions of cracks in the glass workpiece. The light detector on sensing of a lower light intensity then sends a lower voltage to a comparator which triggers a circuit to shutdown the plastic injection cycle.

BRIEF DESCRIPTION OF THE DRAWINGS

This and other objects, features and advantages of the invention will become apparent upon consideration of the specification and the appended drawings in which.

DETAILED DESCRIPTION OF THE PREFERRED EMBODIMENT

Figure 1A:
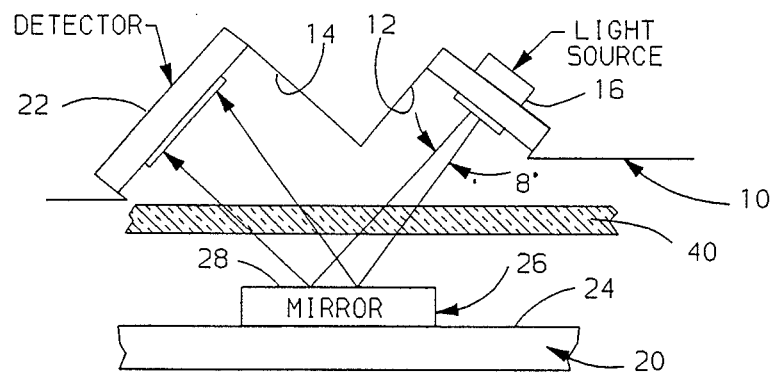
FIGS. 1a and 1b are schematics showing cross sectional views of the optical sensing device in a mold apparatus and the light path in both an unbroken glass workpiece and a broken glass workpiece.

Referring initially to FIG. 1a, a cross sectional view of a mold apparatus having an unbroken glass workpiece held there in-between is shown. It is seen that the upper mold half 10 is equipped with two recessed areas 12 and 14. In the recessed area 12, a light source 16 is mounted. In recessed area 14, a light detector 22 is mounted. In the lower mold half 20, a mirror-type light reflector 26 is mounted on surface 24 of the lower mold half 20 adjacent to the mold cavity (not shown). An unbroken glass workpiece 40 is held in-between the two mold halves 10 and 20. The method of holding the glass workpiece and the construction of the mold cavity are well known in the plastic injection molding/encapsulation art and, therefore, not illustrated.

In our preferred practice, the glass breakage detector is a specialized electronic monitoring system for the detection of breakage in tempered glass workpiece undergoing a polyvinyl chloride (PVC) injection molding/encapsulation process. A typical example of a glass workpiece is an automobile rear quarter panel window with an integral PVC gasket molded around its perimeter. Our glass breakage sensing device is composed of eight electronic subassemblies and a block diagram of its operation is shown in FIG. 2.

First, a main power supply 60 supplies regulated power to all electronic circuits and sensors. The second subassembly is a constant current power supply 70 for the light sources.

Figure 1B:
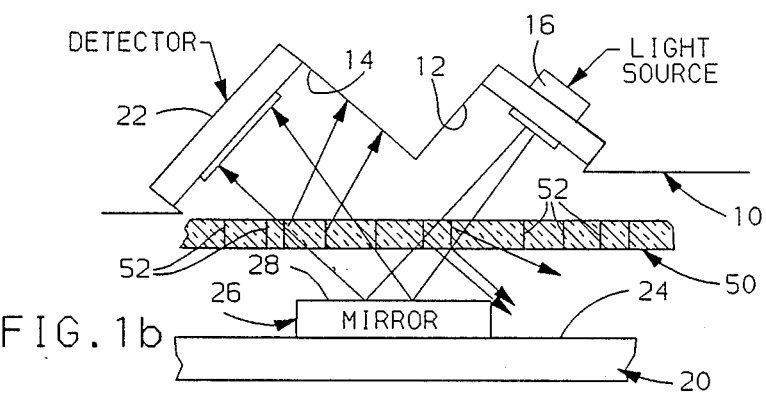
Figure 2:
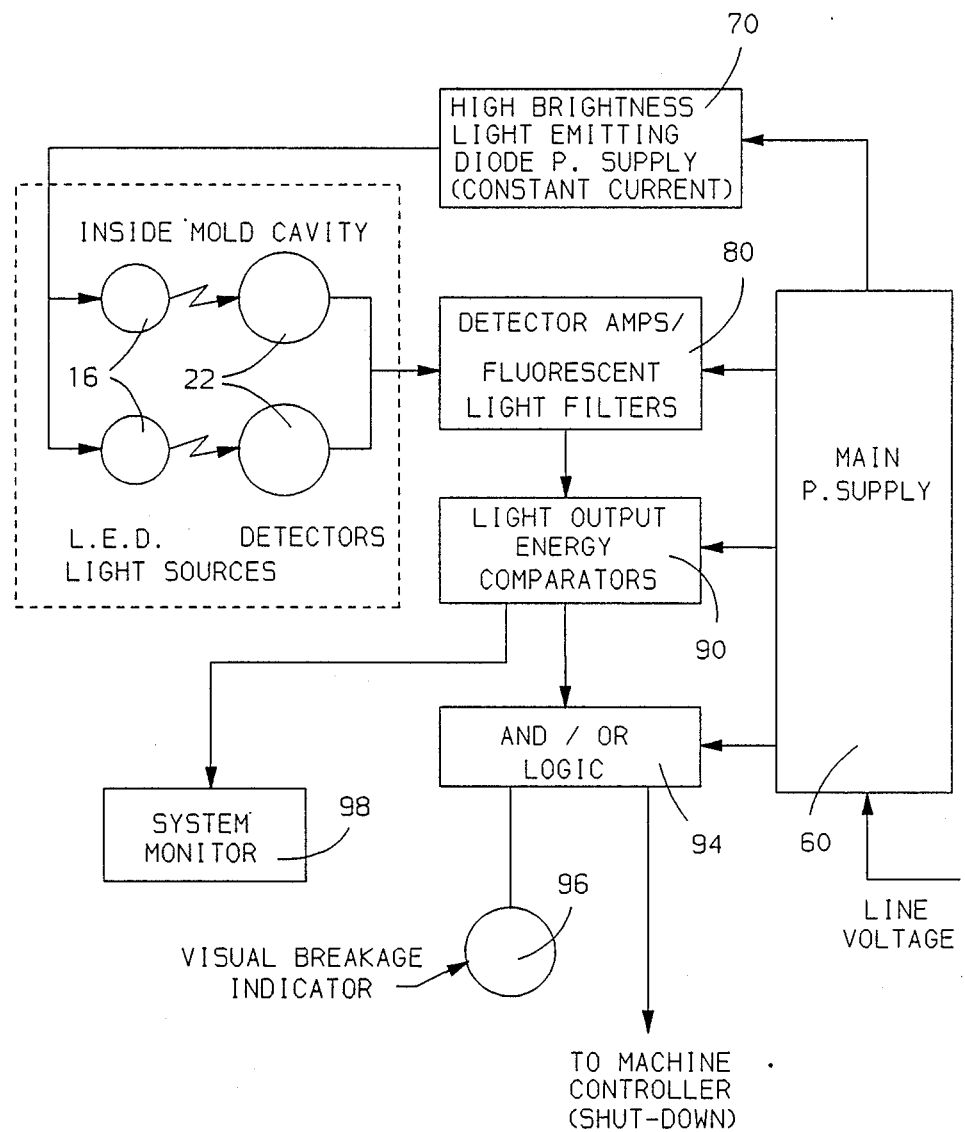
FIG. 2 is a schematic showing a block diagram of the automatic glass breakage sensing device.

The third assembly is the light source which is provided by a pair of ultra-high brightness light emitting diodes (LEDs) 16 as shown in FIGS. 1a, 1b, and 2. The LEDs are chosen for their brightness, high reliability, and stable output characteristics. We have found that the LED light sources are perfect for our sensing device. They produce visible red light having a peak wavelength of 642 nanometers to simplify the alignment to the light detectors 22. The LEDs also exhibit very long usable lifetimes of 100,000 plus hours if driven properly.

The light detectors 22 are a pair of PIN diodes with response curves matched to the wavelength of the light sources. The size of the light detector 22 is selected to maximize system sensitivity. Both the light sources 16 and the detectors 22 are remotely mounted in the upper mold 10 in the recessed areas 12 and 14. No fiber optic cable assemblies are necessary.

The fourth subassembly of our monitoring device is the detector amplifier/fluorescent light filter 80. The detector amplifier boosts the strength of the PIN diodes output signal. Gain of this amplifier is adjustable from the front panel to facilitate calibration of the device. An electronic low-pass filter is incorporated into the device to remove the effects of overhead lighting. Factory floors are typically illuminated by fluorescent lighting and our experiments have shown that the fluctuations from such lamps could cause the circuit to false trigger.

The fifth subassembly in our monitoring device are the threshold voltage comparators 90. This section of the circuit compares the transmitted light voltage level from the amplifier/filter to a threshold (trigger point/machine shutdown) voltage level chosen by the operator. This adjustment can be made from the front panel of the unit. When the light level voltage drops below the threshold voltage point due to glass breakage, the monitor triggers the injection molding machine to stop operation.

The next subassembly in our monitoring device is the and/or logic 94. In our injection molding machine which accepts two glass workpieces at one time, this circuit provides triggering output if either one or both glass work pieces should experience breakage. The last two subassemblies in our monitoring device are visual breakage indicator 96 and the system monitor 98. In a factory where the noise level is extremely high, a visual glass breakage indicator is necessary as provided by a bright flashing light rather than by an audible type of device. Since light detector output 80 and comparator threshold levels 90 are DC voltages, a panel mounted digital volt meter is provided to monitor system operation of these outputs. A panel mounted switch allows stepping through our critical circuit function points. This system monitor 98 also allows for current output adjustment for driving the light sources by displaying LED drive current in milliamperes.

Figure 3:
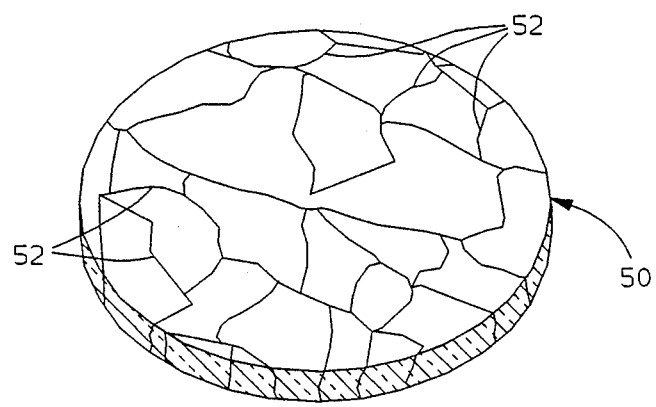
FIG. 3 is an enlarged fragmentary view of a broken tempered glass having cracks run perpendicular to the glass surface.

Our glass breakage monitoring system works by virtue of the fact that tempered glass always breaks in a consistent and uniform manner. This is normally caused by the tremendous amount of tension and compression the glass is under in its normal state. An enlarged view of a broken piece of tempered glass is shown in FIG. 3. The cracks 52 produced in the glass 50 always run perpendicular to the glass surface evenly along the entire surface area of the glass. The uniformity of the breakage allow the light source and the detector to be placed anywhere along the glass workpiece with equal effectiveness.

In operation, light originates from the LED light source 16 in a large cone angle of 8 degrees and travels through the glass workpiece 40 that is being monitored. The light is reflected by a mirror-type light reflector 26 on its surface 28 and travels once again through the glass workpiece 40 and into a light sensitive PIN diode detector 22. Normally, this light path is not obstructed.

When a glass breakage occurs, as shown in FIG. 1b, the light level reaching the detector 22 is greatly reduced due to the obstruction of cracks 52 in the workpiece. The obstructions of cracks 52 cause the light to scatter and thus the intensity reaching the detector 22 is greatly reduced.

In a typical operation, a typical unbroken glass piece light output voltage level must first be obtained, for instance, 10 VDC. The average broken glass workpiece light level must also be determined, for instance, at 2 VDC. The comparator 90 trigger DC voltage must then be set to a level less than 10 and greater than 2, for instance at 4. An adjustment closer to 10 increases system sensitivity. These adjustments are made using the front mounted controls in the system monitor 98.

Under normal conditions, glass breakage does not occur and the light level transmitted through the part stays at a value of 10. If breakage should occur, the light level will drop to 2. This will cause the monitor to shutdown the molding machine and activate the visual breakage indicator because as the light level dropped, it passed through the comparator trigger voltage point of 4.

While our invention has been described in terms of a preferred practice thereof, it is to be appreciated that those skilled in the art would readily apply these teachings to other possible variations of the invention.

The embodiments of the invention in which an exclusive property or privilege is claimed are defined as follows:

1. A mold apparatus having two mold members defining a mold cavity contained therein for use in a plastic injection molding/encapsulation process in which a glass workpiece is peripherally encapsulated with a plastic material to form a gasket comprising, a first mold member adapted to sealingly engage a second mold member for shaping said gasket, a second mold member coacting with said first mold member in a closed position to define the mold cavity for shaping said gasket, said first mold member having a light source and a detector mounted in recessed areas in a first mold surface adjacent to said mold cavity, said second mold member having a light reflector mounted in a recessed area of a mold surface opposite to said first mold surface of said first mold member when said two mold members are in a closed position, said mold cavity being shaped to receive a glass workpiece to peripherally encapsulate said glass workpiece in a plastic material to form the gasket, means for closing said mold members together and means for receiving said plastic material into said mold cavity, whereby said light source and said detector working in combination with said light reflector are capable of detecting broken glass workpieces in the mold cavity so as to shutdown the plastic injection molding process.

2. In a method of detecting a broken glass workpiece in a plastic injection/encapsulation process employing an injection molding machine in which an automatic control circuit shuts off the injection molding machine when the broken glass workpiece is detected in a mold cavity of the injection molding machine, the steps of:

providing a first mold member with a light source and a detector mounted in recessed areas of a first mold surface adjacent to said mold cavity, said first mold member adapted to sealingly engage a second mold member, providing the second mold member with a light reflector mounted in a recessed area of a mold surface opposite to said first mold surface of said first mold member, said second mold member coacting with said first mold member in a closed position to define the mold cavity for shaping plastic material, loading a glass workpiece into said mold cavity and closing said two mold members together, injecting a predetermined amount of the plastic material into said mold cavity to peripherally encapsulate said glass workpiece, and demolding an encapsulated glass workpiece, whereby said light source and said detector work in combination with said light reflector to stop said plastic injection process when the broken glass workpiece is detected prior to said injecting of said plastic material.

* * * * *